UNITED STATES PATENT OFFICE.

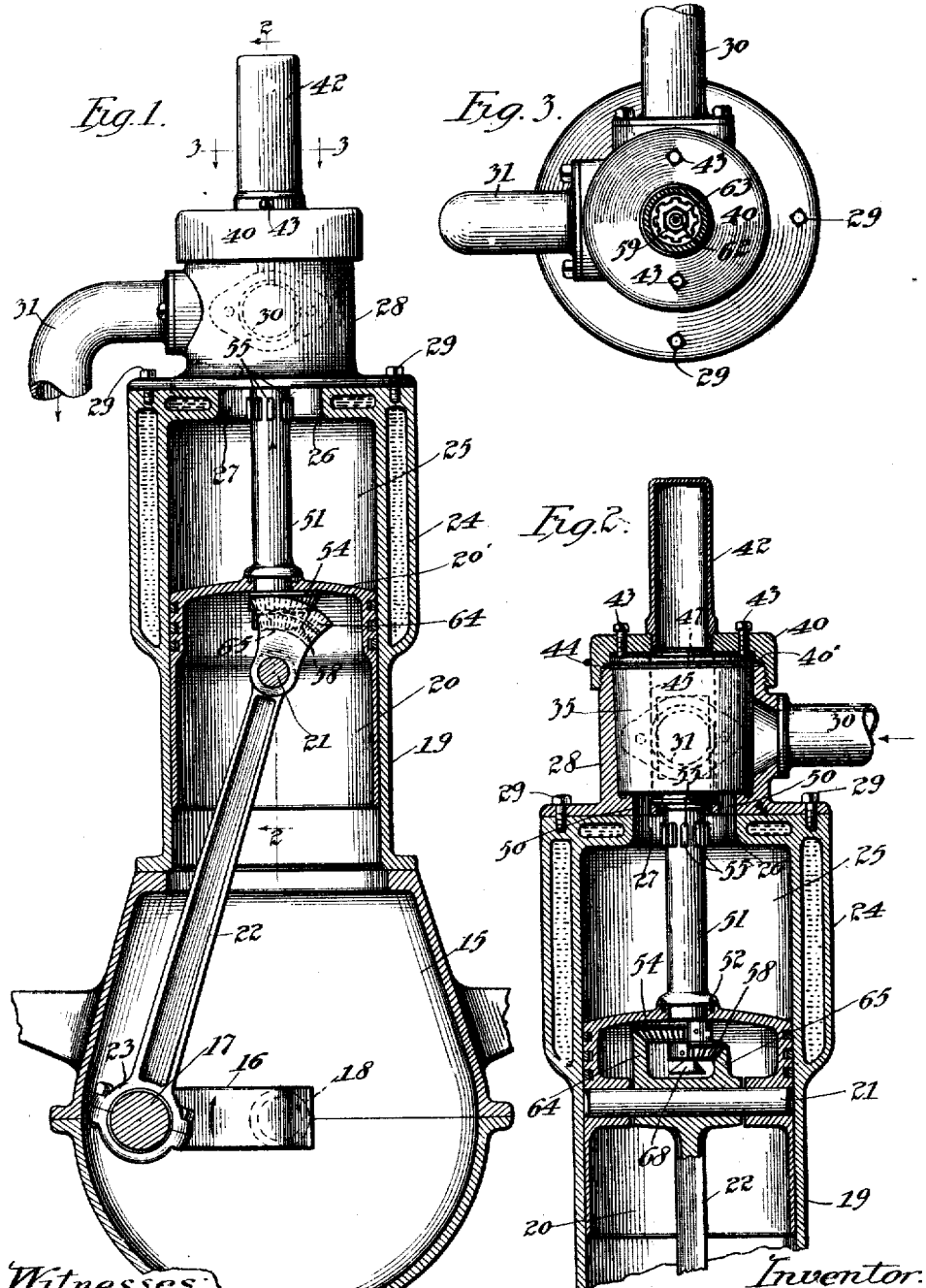

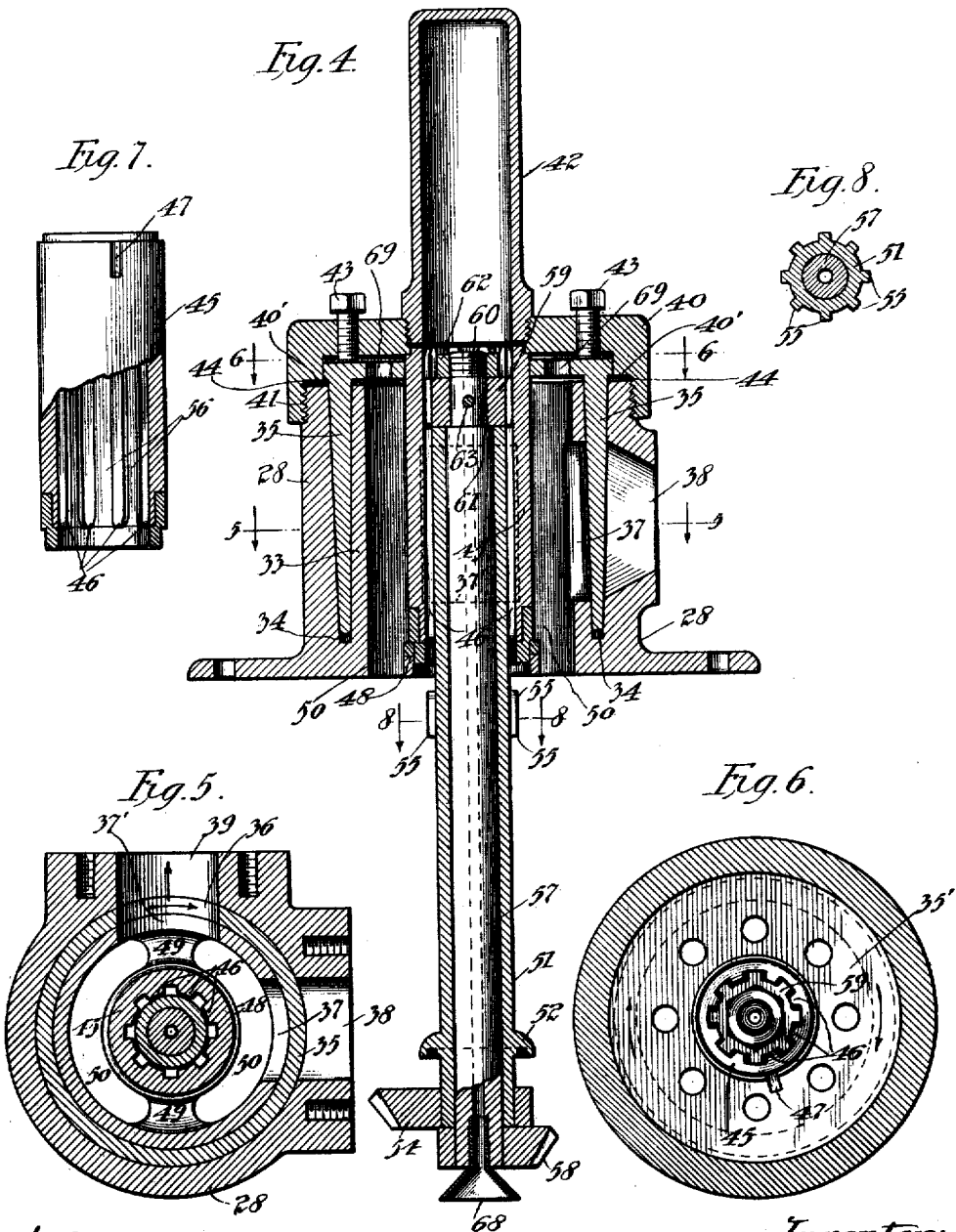

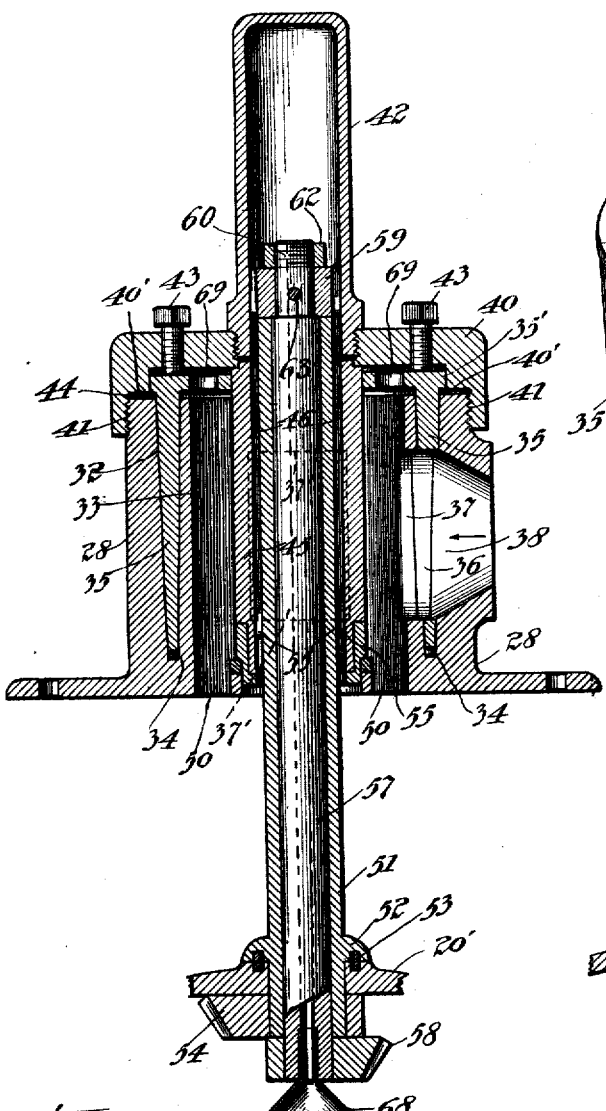
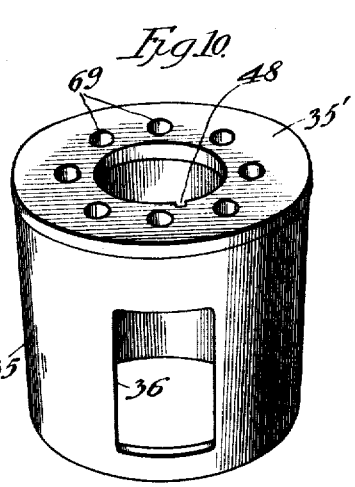
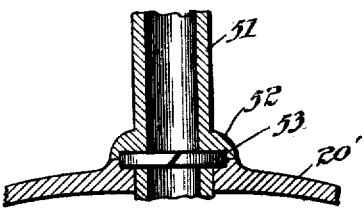

EARL E. McCOLLUM, OF DOWNERS GROVE, ILLINOIS.

VALVE-GEARING MECHANISM.

1,211,952.  Specification of Letters Patent.  Patented Jan. 9, 1917.

Application filed April 5, 1915, Serial No. 19,285. Renewed August 1, 1916. Serial No. 112,526.

*To all whom it may concern:*

Be it known that I, EARL E. MCCOLLUM, a citizen of the United States, residing at Downers Grove, in the county of Dupage and State of Illinois, have invented certain new and useful Improvements in Valve-Gearing Mechanisms, of which the following is a specification.

My invention relates to improvements in valve gearing.

One of the objects of my invention is to provide a simplified valve gearing whereby the valve is quickly moved to wide open position, in which position it is permitted to dwell, and after a predetermined period of time it is quickly moved to closed position, thereby to permit maximum time and maximum openings of the ports for the passage therethrough of the motor fluid.

Another object of my invention is to provide means, in association with a connecting rod of the engine, or other pitman, for moving a valve for a four cycle internal combustion engine in one-to-two relation with the driving shaft of the engine, without employment of the usual valve shaft and a train of connecting gearing.

Other and further objects of my invention will become readily apparent, to persons skilled in the art, from a consideration of the following description when taken in conjunction with the drawings, wherein:—

Figure 1 is a vertical, central section of an engine provided with one embodiment of my invention. Fig. 2 is a fragmentary section taken on line 2—2 of Fig. 1. Fig. 3 is a section taken on line 3—3 of Fig. 1. Fig. 4 is a central vertical section of the valve, valve casing and means for rotating the valve showing the intake port closed by the valve. Fig. 5 is a transverse section taken on line 5—5 of Fig. 4. Fig. 6 is a transverse section taken on line 6—6 of Fig. 4. Fig. 7 is an elevation, part in section, of an internally toothed, valve-moving sleeve, for rotating the valve. Fig. 8 is a transverse section, taken on line 8—8 of Fig. 4. Fig. 9 is a view similar to Fig. 4, showing the intake port open. Fig. 10 is a perspective view of the valve. Fig. 11 is a detail.

In all the views the same reference characters are employed to indicate similar parts.

I have shown my invention in connection with an internal combustion engine of the usual type, wherein 15 is the crank casing, 16 is the crank, 17 the wrist pin, 18 the main driving shaft, 19 the cylinder, 20 the reciprocating piston therein, and 21 the pin by which the connecting rod 22 is connected to the piston. The other end of the connecting rod being connected to the wrist pin 17, as at 23. 24 is a water jacket around the combustion chamber 25. These features are typical of engines of this character.

The cylinder head 26 is perforated, as at 27, and to the upper end of the cylinder is connected a valve casing 28, as by bolts 29. Properly connected to the valve casing 28 is an intake pipe 30 and an exhaust pipe 31. The valve casing 28 is provided with an outer tapered wall 32 and an inner tapered wall 33 providing a tapered valve space 34 for the tapered annular valve 35. In this particular embodiment the valve 35 is provided with a single port 36 adapted to register with the intake ports 37 and 38 made in the inner and outer walls 33 and 32, respectively, and with a similar exhaust port 37' and 39. A cap 40 is screw threaded to cover the top of the casing 28, as at 41, and is centrally perforated and screw threaded for engagement of a closed tube 42. Adjusting screws 43, pass through the top of the cap 40, and bear upon the top wall 35' of the valve 35. These adjusting screws 43 are intended to prevent the valve 35 from being raised out of the tapered valve space contained between the walls 32 and 33. An additional adjusting means may be provided by the annular shims 44—44 that are contained between the top of the wall 32 and the shoulder 40' of the cap 40. Secured to the valve 35, in a central perforation thereof, or or made a part of said valve, is a tube 45 provided with inwardly extending teeth or ribs 46 which are continuous from end to end of said tube. In the present exemplification, tube 45 is made to turn with the valve 35 by means of the feather 47 which engages in the feather-way 48 of the valve, when the two parts occupy their proper relative positions. The lower end of the tube 45 rests in the ring 45' which is secured to the cylinder head 28 by the integral ribs 49—49 leaving spaces 50—50 on either side thereof through which the motive fluids and the products of combustion may freely pass to and through the ports 38 and 39. It will now be seen that when the tube 45 is rotated, the valve 35 is rotated thereby.

Rotatively and centrally fixed to the piston head 20' is a vertically extending tube 51, provided with a shoulder 52 near its lower end, within which is a packing ring 53, to bridge the joint between said tube and the upper surface of the piston head 20'. Secured to or made as an integral part of the lower end of the tube 51, is a segmental gear 54. Secured to or constructed as a part of the tube 51, are a series of spaced apart circumferentially extending series of teeth 55, intermediate the ends of said tube, and more clearly shown in Figs. 4 and 8. These teeth are adapted to enter the interdental spaces 56—56 of the tube 45, as shown in Fig. 9. Inside of the tube 51 is another smaller tube 57 which is freely rotatable therein and which projects beyond each end of the larger tube. Secured to or integral with the lower end of the tube 57 is a segment of a gear 58, and to the upper end of the tube 57 is secured a pinion 59, shown in cross section in Fig. 8, having teeth which are also adapted to enter the interdental spaces 56—56 of the valve tube 45 between the teeth 46 that are located within the interior of said tube. The upper end of the rod 57 is reduced and is provided with a screw threaded end 60 and a shoulder 61, against which the pinion 59 is held by a nut 62, that engages the end 60 of the rod 57. A pin 63 may be employed to secure the pinion 59 in place.

The upper end of the pitman or connecting rod 22 carries a geared segment 64 which coöperates with a geared segment 54 that is secured to the lower end of the outer tube 51. The connecting rod is also provided with a geared segment 65 which coöperates with a geared segment 58 that is connected to the inner tube 57. The radial dimensions of the segment 64 bears the same relation to the segment 54 as does the segment 65 with the segment 58 so that the inner and outer tubes 51 and 57 will be oscillated by the oscillatory motion of the connecting rod 22 at approximately the same rate of speed. The tubes 51 and 57 are oscillated by the geared mechanism just described but the rate of speed will be proportional to the cosine of the crank angle or inversely to the sine of the crank angle.

When the crank or wrist pin is passing through a quadrant of its motion, usually indicated as the dead center, or when it is passing from a point taken at one side of a vertical plane through the shaft 17, until it reaches substantially the same point on the opposite side thereof, the tubes 51 and 58 will be rotated at their highest velocities and when the crank pin is passing through the next quadrant of its motion, that is to say, when it is substantially ascending or descending in its movements to reciprocate the piston, the end connected to the crank pin 17, at this time, is very slightly oscillated and therefore when the pin is passing through this quadrant of its motion the tubes 51 and 57 are practically stationary.

When the crank pin 17 is ascending, as shown in Fig. 1, the tubes 51 and 57, together with the piston 20 are being elevated, or raised, and the teeth 55 of the tube 51 are about to enter the interdental space 56 of the valve tube 45. Just about the time that the teeth 55 on the tube 51 enter said space in the valve tube 45, the pinion 59 leaves engagement therewith, as shown in Fig. 9 of the drawings. By the time the pin 17 begins to pass the dead center point, or through the upper quadrant of its motion, the teeth 55 of the tube 51 have made connection with the valve tube and the segment 64 carried by the connecting rod 22 begins to rotate the segment 54 carried by the tube 51. At the same time the segment 65 rotates the pinion 58 carried by the inner tube 57, in the opposite direction, but inasmuch as the pinion 59, which is connected to the inner tube, is not now connected with the valve, the inner tube 57 is rotated idly. During the movement of the pin 17 through the quadrant of its motion, if the valve 35 has been rotated, through the connections described, so that the port 36 registers with the intake port 38, at the time when the pin 17 is at the end of the upper quadrant of its motion, the valve will now remain open and substantially immovable until the pin 17 has finished the next succeeding quadrant of its motion, or while it is descending. When the pin 17 arrives at approximately the horizontal plane it is shown to be in Fig. 1, but on the opposite side of the shaft 18, the teeth 55 on the sleeve 51 will occupy substantially the disengaged position shown in Fig. 1 and the pinion 59 on the tube 57, will have made engagement with the teeth 46 of the valve tube 45 and now as the crank pin 17 passes through the lower quadrant of its motion, or from the right to the left hand side, the segment 65, which rotates the segment 58 of the tube 57, will be rapidly rotated and move the valve to close the valve port 38, after which the piston 20 will start on its compression stroke. During the next two cycles of the motion of the piston the valve will remain closed, because there are no ports through the casing 28 with which the valve 36 may register during the compression and power stroke of the piston. At the end of the power stroke, however, the valve port 36 will have arrived opposite the exhaust port 39, as shown in Fig. 5, and the next succeeding stroke of the piston will serve to scavenge the cylinder through the exhaust port and thus the four cycles of the engine have been completed.

I have placed a funnel 68 at the lower end of the tube 57 so that the movement of oil due to the splash of the crank in the casing may cause it to pass up through the interior of the tube 57, and lubricate the valve and connecting parts. Of course other means may be employed for lubricating these parts, as for instance an oil cup or other similar device may be placed upon the upper end of the closed tube 42. I have perforated the upper wall 35' of the valve 35, as at 69, so as to equalize the pressure on each side of the valve.

While I have shown a single embodiment of my invention for purposes of clear disclosure, it is manifest that changes in the form and disposition of the parts may be made within the scope of the appended claims.

Having described my invention, what I claim is:—

1. In an engine, the combination with a rotatable crank, a connected reciprocable member and a connecting rod; of a valve gear mechanism comprising a rotary cylinder-port controlling valve, and means associated with the connecting rod and driven thereby for rotating said valve, said means being carried entirely by the reciprocable member.

2. In an engine, the combination with a rotatable crank, a member reciprocatable thereby and a connecting rod, connecting said crank and member; of a valve gear mechanism comprising a valve and means operable by said connecting rod for moving said valve at all times proportionally to the cosine of the crank angle.

3. In an engine, the combination with a rotatable crank, a member reciprocatable thereby, and a connecting rod, connecting said crank and member; of a valve gear mechanism comprising a rotatable valve and means operable by said connecting rod for rotating said valve at a speed rate proportional at all times to the cosine of the crank angle.

4. In an engine, the combination with a rotatable shaft, a rotatable crank, a member reciprocatable thereby and a connecting rod, connecting said crank and member; of a valve gear mechanism for converting substantially constant rate rotation of said shaft into differential or substantially intermittent rate motion of a valve, comprising a valve and oscillatable means connecting said connecting rod and valve, whereby to move the latter proportionally to the cosine of the crank angle and inversely proportional to the sine thereof.

5. In an engine, the combination with a rotatable shaft, a rotatable crank, a piston reciprocatable thereby and a connecting rod, connecting said crank and piston; of a valve gear mechanism for converting substantially constant rate motion of said shaft into differential, or substantially intermittent rate motion of a valve, comprising a valve, an oscillatable member connecting said valve and connecting rod for imparting motion to the valve substantially after cessation of the instroke of the piston and another oscillatable member connecting said valve and connection rod, for imparting motion to the valve substantially after cessation of the outstroke of the piston whereby to open and close the ports of said engine.

6. In an engine, the combination with a rotatable shaft, a rotatable crank, a piston reciprocatable thereby and a connecting rod connecting said crank and piston, of a valve gear mechanism for converting substantially constant rate rotation of said shaft into differential or substantially intermittent rate motion of a valve comprising a rotatable valve, and means connecting said rod and valve and responsive only to angular movement of the connecting rod for imparting unidirectional rotation to the valve during the motion of the oppositely directed oscillatory movements of the connecting rod whereby to quickly open and close the ports of the engine.

7. In an engine, the combination with a ported engine cylinder, a shaft, crank, piston and connecting rod; of a rotatable valve having a single port adapted to register with the cylinder ports and means operable solely by the oscillatory movement of the connecting rod to cause rapid, unidirectional advances of the valve during selected portions of the connecting rod movement and dwells during intervening movements, the ports located to be opened by the valve during its rapid advances.

8. In an engine, the combination with a rotatable crank, a piston and a connecting rod; of a valve mechanism comprising a valve, a gear associated therewith and a second gear oscillated by the connecting rod and meshing with the first mentioned gear.

9. In an engine, the combination with a rotatable crank, a piston and a connecting rod, of a rotatable valve, and means responsive only to the oscillatory movement of said connecting rod for rotating said valve.

10. In an engine, the combination with a rotatable crank, a piston and a connecting rod, of a valve mechanism comprising a rotatable valve, a gear intermittently connected therewith, and a second gear fixedly mounted on the connecting rod for oscillation therewith and meshing with the first mentioned gear.

11. The combination with a rotatable crank member, a reciprocable member and a connecting rod for transmitting motion from one said member to the other, of a rotatable part and means operable solely by the oscillatory movement of said connecting rod for moving said rotatable part at a rate of speed proportional to the cosine of the crank angle.

12. In an engine, the combination with a rotatable crank, a piston and a connecting rod, of a valve gear mechanism comprising a valve, a rotatable rod projecting from said piston, an independently rotatable tube surrounding said rod, beveled gears carried at the lower ends of the rod and tube, beveled gears carried by the connecting rod and meshing with the aforesaid gears at opposite sides thereof and means connecting the upper ends of said rod and tube with the valve for translating the oscillatory movement thereof into intermittent uni-directional rotation of said valve.

13. In an engine, the combination with a rotatable crank, a piston and a connecting rod, of a rotatable valve, a member associated therewith, means driven by the oscillatory movement of said connecting rod for oscillating said member, and means connecting said member and said valve for translating the oscillatory movement of the former into intermittent uni-directional rotation of the valve.

14. In an engine, the combination with a rotatable crank, a piston and a connecting rod, of a rotatable valve, a pair of independently rotatable members, means driven by the oscillatory movement of said connecting rod for oscillating said pair of members in opposite directions, and means connecting the said members with the valve for translating the oscillatory movement of the former into intermittent uni-directional rotation of said valve.

15. In an engine, the combination with a rotatable crank, a connected reciprocable member and a connecting rod; of a valve gear mechanism comprising a rotary cylinder-port controlling valve, and oscillatory means driven from the connecting rod and carried by the reciprocable member for operating said valve.

16. In an engine, the combination with a rotatable crank, a connected reciprocable member and a connecting rod; of a valve gear mechanism comprising a rotary cylinder-port controlling valve, and oscillatory means actuated solely by the angular movement of the connecting rod and carried by the reciprocable member for operating said valve.

17. In an engine, the combination with a crank operating in timed relation with the engine, of a valve gear mechanism comprising a valve and means connecting said valve and crank for moving said valve at all times proportionally to the cosine of the crank angle.

18. In an engine, the combination with a crank, of a valve gear mechanism for converting substantially constant rate rotation of said shaft into differential or substantially intermittent rate motion of a valve, comprising a valve, and means connecting said crank and valve whereby to move the latter proportionally to the cosine of the crank angle and inversely proportionally to the sine thereof.

19. In an engine, the combination with a crank, of an axially fixed rotatable valve, and means responsive only to the horizontal component of crank movement for operating said valve.

20. In an engine the combination with a crank, a piston and a connecting rod, of an axially fixed rotatable valve, and means responsive only to the component of crank movement at right angles to the axis of the piston for operating said valve.

21. In an engine, the combination with a piston, and rotatable crank, of a rotatable valve, a member associated therewith, means driven by the component of crank movement at right angles to the axis of the piston for oscillating said member and means connecting said member and said valve for translating the oscillatory movement of the former into intermittent uni-directional rotation of the valve.

22. In an internal combustion engine the combination with the engine crank shaft, of a crank operating at engine crank shaft speed, and a valve gear mechanism comprising a valve and means connecting said valve and crank for moving said valve at all times proportionally to the cosine of the crank angle.

23. In an internal combustion engine the combination with the engine crank shaft, of a crank operating at engine crank shaft speed, a valve gear mechanism for converting substantially constant rate rotation of said crank into differential or substantially intermittent rate motion of a valve, comprising a valve, and means connecting said crank and valve, whereby to move the latter proportionally to the cosine of the crank angle and inversely proportionally to the sine thereof.

24. In an internal combustion engine the combination with the piston and engine crank shaft, of a crank operating at engine crank shaft speed, a rotatable valve, a member associated therewith, means driven by the component of crank movement at right angles to the axis of the piston for oscillating said member, and means connecting said member and said valve for translating the oscillatory movement of the former to intermittent uni-directional rotation of the valve.

In testimony whereof I hereunto set my hand in the presence of two subscribing witnesses.

EARL E. McCOLLUM.

In presence of—
STANLEY W. COOK,
MARY F. ALLEN.

Copies of this patent may be obtained for five cents each, by addressing the "Commissioner of Patents, Washington, D. C."